United States Patent Office 3,006,890
Patented Oct. 31, 1961

3,006,890
NEW RESIN COMPOSITIONS AND CURING AGENT THEREFOR
William C. Duckworth, Atlanta, and Samuel L. Norwood and Thomas W. Sauls, College Park, Ga., assignors to Tennessee Corporation, New York, N.Y., a corporation of New York
No Drawing. Filed July 21, 1958, Ser. No. 749,603
4 Claims. (Cl. 260—47)

This invention relates to new synthetic resin compositions and products and more particularly to the curing of epoxy resins using bis (3,4-diaminophenyl) sulfone.

The epoxy resins are now well known. They comprise complex polymeric reaction products of polyhydroxy compounds such as polyhydric phenols and alcohols with polyfunctional halohydrins such as epichlorohydrin and glycerol dichlorohydrin. Typical polyhydroxy compounds used are glycerol, resorcinol and various bisphenols resulting from the condensation of phenol with aldehydes and ketons. Usually the amount of the difunctional chlorohydrin used is more than the equivalent of the polyhydric compound but less than twice the equivalent, although in some cases an excess above twice the equivalent is used. The reaction is carried out in the presence of alkali the amount of which is usually sufficient to combine with the halogen of that amount of halohydrin which is required to react with the polyhydric compound and is preferably in excess of this requirement.

The reaction mixture comprises glycidyl polyethers of polyhydric compounds such as those named above, having a 1,2-epoxy equivalence greater than 1.0. In such complex reaction mixtures, there are terminal epoxy groups and usually also terminal primary hydroxyl groups in varying proportions depending upon the proportions of the reactants and the conditions of the reaction.

Resins of this type are disclosed in various patents such as U.S. Nos. 2,456,408 and 2,585,115. Epoxy resins may also be obtained on the market under various trade names such as "Epon," "Araldite," and "Devran." The series of "Epon" resins, for example, includes Epon 562, made by condensing glycerol with epichlorohydrin to form a mixture of mono-, di-, and triglycidyl ethers of glycerol; Epon 828, the diglycidyl ether of 2,2-(bis-4-hydroxyphenyl)-propane made by condensing bisphenol A with epichlorohydrin; various homologous polyglycidyl ethers containing chains of bisphenol A and epichlorohydrin residues such as Epon 834, Epon 864, Epon 1001; polyglycidyl ethers of polyhydric phenols containing three or more hydroxyl groups, such as Epon 1310; etc. The following table lists the epoxy equivalence of this series of Epon resins:

Table I

| Glycidyl ether: | Grams ether per gram equivalent of epoxy |
|---|---|
| Epon 562 | 140–165 |
| Epon 828 | 200 |
| Epon 834 | 255 |
| Epon 864 | 340 |
| Epon 1001 | 490 |
| Epon 1310 | 200–220 |

It has been proposed heretofore to use various diamines and polyamines, of both aliphatic and aromatic nature, as curing agents to convert such liquid or low-melting epoxy resins into hard, high-melting or infusible resins. For example, the use of ethylene diamine, hexa methylene diamine, diethylene triamine, triethylene tetramine, diacetone diamine, diethylaminopropylamine, 4,4'-diaminodiphenylmethane have been described in prior patents and technical literature, and more recently diaminodiphenylsulfones have been disclosed for this purpose in the copending application of Charles E. Feazel and Walter H. C. Rueggeberg, Serial No. 592,429 filed June 19, 1956.

For various reasons, however, many of such previously proposed amines are disadvantageous in that they limit the usefulness of the resin or are themselves limited in their applicability to epoxy resin formation. For instance, the aliphatic primary diamines like ethylene diamine react rapidly with a glycidyl ether such as Epon 828

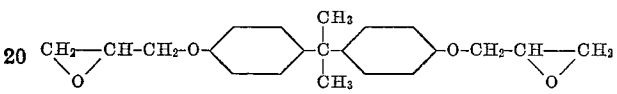

in an exothermic manner, and in curing large bulks of such ethers the high heat of reaction may char the product and render it useless. Consequently the use of such amines is largely confined to applications where the resin is used in thin films or layers and it is possible to allow rapid dissipation of heat to the surroundings. In some instances, the curing can be completed in as little time as 15 to 20 minutes with an attendant evolution of much heat which tends to vaporize the diamines of lower molecular weight, thus causing bubbles to form in the resin. In order to overcome this difficulty, it has been proposed to modify simple diamines by substituting alkyl groups for the hydrogen atoms on one of the amino groups. The resulting modified amines, such as dimethylaminopropylamine, $(CH_3)_2NCH_2CH_2CH_2NH_2$, and diethylaminopropylamine, $(C_2H_5)_2NCH_2CH_2CH_2NH_2$, are classed as slow curing agents, their mixture with a glycidyl ether setting to a hard solid within 30 to 120 minutes or longer at room temperature depending upon the amount of amine used and the mass of resin employed.

Similar difficulties have been encountered when amines have been used heretofore to cure epoxy resins comprising polyethers of polyhydric phenols and alcohols. For example, Epon 562 mentioned above and in certain of the following examples is a mixture of the mono-, di-, and triglycidyl ethers of glycerol. On the other hand, tri- and tetraglycidyl ethers of polyhydric phenols are obtained when the so-called novolak resins are reacted with epichlorohydrin. The term "novolak" resin identifies a non-curable phenolic resin made by condensation of a phenol with formaldehyde under acid conditions. Such a resin might have a structure like the following:

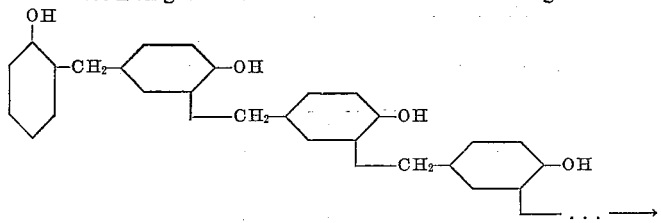

The tetraglycidyl ether of this compound has a molecular weight of 694 and an epoxy equivalent of 173.5. Epon 1310, cured in one of the following examples, is such an ether, perhaps including some polymers of lower epoxy content since its molecular weight is 703 and its epoxy equivalent is 200–220.

Another disadvantage exhibited by some known curing agents is that they impart undesirable colors to the cured product. Thus, diaminodiphenylmethane causes a dark brown film on the surface of the resin, but when this film is mechanically removed as by filing, the substrate appears to be free of dark colors. This indicates that under the conditions of cure, diaminodiphenylmethane probably is not resistant to oxidation.

One of the most desirable properties for epoxy resin in the casting and tooling fields is better heat resistance than has hitherto been achieved. We have now found that exceptionally good heat resistant resins can be obtained by curing epoxy resins with bis (3,4-diaminophenyl) sulfone. This compound has the following structure:

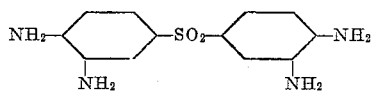

It can be prepared (Beilstein Volume 13, page 567) by dinitrating bis (4-chlorophenyl) sulfone with nitric acid in the presence of sulfuric acid. This bis (3-nitro-4-chlorophenyl) sulfone is subsequently aminated by ammonolysis to the bis (3-nitro-4-aminophenyl) sulfone which is then reduced by zinc and a mineral acid to the bis (3,4-diaminophenyl) sulfone. The melting point of this compound is 174–6° C.

Another very outstanding feature of our new compositions is their very good flexural strength. Other resin compositions with comparable heat distortion temperatures have as little as one-tenth the flexural strength of our compositions.

Other advantages of our invention are ease of mixing, controlled rate of curing (making possible a stage "B" type product such as a molding powder), and relative economy of use due to the octafunctional nature of the curing agent (8 replaceable hydrogen atoms on the nitrogen atoms, each of which is capable of reacting with one epoxy group).

Furthermore, no evidence of skin or eye irritation has been observed for our new curing agent.

Considerable variation is permissible in the amount of curing agent to be employed, but the optimum range for obtaining the highest heat distortion temperatures appears to have the approximate limits of 80–125% of the equivalent amount of the curing agent, equivalency being based on one replaceable aminohydrogen atom per epoxy group. Peak values have been obtained in the neighborhood of 110%.

Above 225° C. the resin may decompose slowly, and below 150° C. the resin is only partially cured. Within this range of temperatures, curing for a period of anywhere from one to six hours or more will be found to produce the advantageous properties set forth and exemplified below.

As a working example, one hundred parts of Epon 828 (a commercial epoxy resin with an average epoxy equivalent weight of 196) was heated to 150–160° C. and twenty parts of bis(3,4-diaminophenyl) sulfone was stirred into this mixture. It quickly melted and became clear and compatible. The hot melt was then poured into the mold and placed in an oven at 200° C. for 3 hours at which time it was cured to a very hard tough resin with excellent properties. Tests carried out the same way with various resins gave the following results:

Table No. 1

| Epoxy resin | P.p.h. TAPS* | H.D.T.[a] (° C.) | F.S.[b] (p.s.i.) | I.R.[c] (ft. lbs./in.) | C.S.[d] (p.s.i.) | Curing schedule (hrs. at ° C.) |
|---|---|---|---|---|---|---|
| (1) | 20 | 231 | 12,370 | .202 | | 3/200 |
| (2) | 20 | 218 | 11,710 | .244 | 11,950 | 3/200 |
| (3) | 21.9 | 244 | 10,250 | .228 | 12,390 | 3/200 |
| (4) | 18.7 | 230 | 8,720 | .242 | 12,280 | 3/200 |

* Bis(3,4-diaminophenyl)sulfone.
[a] Heat distortion temperature—A.S.T.M. method D648–45T.
[b] Flexural strength—A.S.T.M. method D790–49T.
[c] Impact resistance—A.S.T.M. D256–54T.
[d] Compressive strength—A.S.T.M. method D695–54.

(1) Epon 828—a commercial epoxy resin with an average epoxy equivalent weight of 196 (Shell).
(2) Erl 2774—a commercial epoxy resin with an average epoxy equivalent weight of 196 (Bakelite).
(3) Der 332—a commercial epoxy resin with an average epoxy equivalent weight of 176 (Dow Chemical).
(4) An experimental epoxy resin made from dihydroxy diphenyl sulfone and epichlorohydrin. It has an epoxy equivalent weight of 206 and is essentially the diglycidyl ether of this bisphenol.

As will be noticed from Table No. 1, these cured resins possess other very fine properties in addition to very high heat distortion temperatures. This is an unusual and unexpected discovery, since in most of the cases where curing agents product high heat distortion properties, the cured resins are very inferior in other structural properties. For instance, when Epon 828 was cured with 16.7 parts per hundred of maleic anhydride and 27.7 parts of pyromellitic dianhydride, a casting was obtained with a heat distortion temperature of 251° C., somewhat higher than in the case of resin (1) of the above table. However, this casting was found to have a flexural strength of only 970 pounds per square inch, less than one-tenth that of resin (1).

Thus it will be observed that, generally speaking, the invention overcomes the weaknesses of prior curing agents while still achieving essentially the same high heat resistance.

It will be understood that the foregoing detailed description and examples are for purposes of illustration only and that reference should be had to the appended claims for a definition of the limits of the invention.

What is claimed is:

1. A composition comprising a mixture of a glycidyl polyether of polyhydric organic material of the group consisting of polyhydric alcohols and phenols and an amount of bis(3,4-diaminophenyl) sulfone curing agent effective to cure said mixture to a solid resinous product upon heating, said amount being 80%–125% of equivalency on the basis of one replaceable amino hydrogen atom per epoxy group.

2. The process of curing an epoxy ether having a 1,2-epoxy equivalency greater than 1.0 which comprises mixing said ether with bis(3,4-diaminodiphenyl) sulfone and heating the mixture to cure it to a hard, solid state, the amount of said curing agent being 80%–125% of equivalency on the basis of one replaceable amino hydrogen atom per epoxy group.

3. The process of curing a resinous material comprising a glycidyl polyether of a polyhydric organic material selected from the group consisting of polyhydric alcohols and phenols which comprises mixing said material with bis(3,4-diaminophenyl) sulfone, the amount of said sulfone being 80%–125% of equivalency on the basis of one replaceable amino hydrogen atom per epoxy group, and heating the mixture to a temperature in the range of 150° C. to 225° C.

4. A composition of matter comprising a glycidyl polyether of a polyhydric organic material of the group consisting of polyhydric alcohols and phenols having a 1,2-epoxy equivalency greater than 1.0 and an amount of bis(3,4-diaminophenyl) sulfone curing agent effective to cure said polyether, said amount being 80%–125% of equivalency on the basis of one replaceable amino hydrogen atom per epoxy group.

References Cited in the file of this patent

UNITED STATES PATENTS 2,909,494    Parry et al.            Oct. 20, 1959

OTHER REFERENCES

Rueggelberg et al.: "Modern Plastics," vol. 35, No. 6, February 1958.

Lee et al.: "Epoxy Resins," 1957, McGraw-Hill Book Co., Inc., pp. 51 and 63–69.